United States Patent [19]
Milford et al.

[11] Patent Number: 5,922,033
[45] Date of Patent: Jul. 13, 1999

[54] EARTH CHORD DETERMINATION IN A SATELLITE AT LOW SPIN RATES

[76] Inventors: Richard I. Milford, 210 14th St.; John R. Selmon, 1612 Lynngrove Dr., both of Manhattan Beach, Calif. 90266; John F. Yocum, 28717 Shire Oaks Dr., Rancho Palos Verdes, Calif. 90275

[21] Appl. No.: 08/753,659

[22] Filed: Nov. 27, 1996

[51] Int. Cl.$^6$ ................................ B64G 1/36; G06G 7/78
[52] U.S. Cl. ............................................. 701/13; 244/171
[58] Field of Search .................................. 244/164, 171; 701/13, 226

[56] References Cited

U.S. PATENT DOCUMENTS

| | | | |
|---|---|---|---|
| 4,752,884 | 6/1988 | Slafer et al. | 701/13 |
| 4,837,699 | 6/1989 | Smay et al. | 701/13 |
| 5,020,744 | 6/1991 | Schwarzschild | 244/164 |
| 5,452,869 | 9/1995 | Basuthakur et al. | 701/13 |

*Primary Examiner*—Virna Lissi Mojica
*Attorney, Agent, or Firm*—Terje Gudmestad; Georgann Grunebach; Michael W. Sales

[57] ABSTRACT

An earth chord sensor on board a satellite produces an electrical pulse as the satellite spins and sweeps the sensor across the earth. If the satellite is spinning at a low spin rate or if the sensor is measuring a long earth chord, the sensor produces an irregular pulse with sharp voltage peaks rather than a near trapezoidal pulse. The present invention digitizes the output of the earth chord sensor and a processor processes the digitized output through a data buffer to detect the leading edge peak and trailing edge peak of the pulse. The processor may detect the peaks through parabolic curve fitting among the digitized data points of the sensor output. The processor calculates the earth chord time as the time width of the pulse between the detected leading edge peak and trailing edge peak of the pulse and transmits, by telemetry, the calculated earth chord time to a ground station for use in satellite positioning.

22 Claims, 5 Drawing Sheets

EARTH CHORD DETERMINATION IN A SATELLITE AT LOW SPIN RATES

BACKGROUND OF THE INVENTION

1. Field of the Invention

The present invention relates to measuring earth chords in a satellite positioning system and, more particularly, to measuring long earth chords or measuring earth chords in a satellite spinning at a low spin rate.

2. Description of Related Art

Once a satellite is separated from a rocket launch vehicle, rocket thrusters on the satellite are activated to place the satellite into a required orbit, such as a geosynchronous orbit around the earth. In order to determine when and in what direction the thrusters should be activated to reach geosynchronous orbit, the location and attitude of the satellite in relation to the earth must be determined. Because the orientation of the satellite is not typically seen or measured from the earth, the attitude of the satellite is normally determined through use of on-board sensors on the satellite. The on-board sensors send, by telemetry, information to a ground station on the earth, which processes the information to determine the orientation of the satellite and fire the thrusters accordingly.

Generally, a satellite includes an earth chord sensor, which is an infrared sensitive device that detects the heat of the earth as the satellite spins and sweeps the sensor across the earth. One such earth chord sensor is the Barnes Horizon Crossing Indicator (HCI), model no. 283401-1001-9, manufactured by Barnes. Ideally, this earth chord sensor generates a near trapezoidal pulse, wherein the leading edge of the pulse indicates when the sensor has first contacted the earth and the trailing edge of the pulse indicates that the sensor has completed its sweep across the earth. The width of the pulse indicates the earth chord. For example, if the sensor sweeps across the equator, the pulse would be much wider than if the sensor sweeps across an area near the earth's poles.

Figure 1:
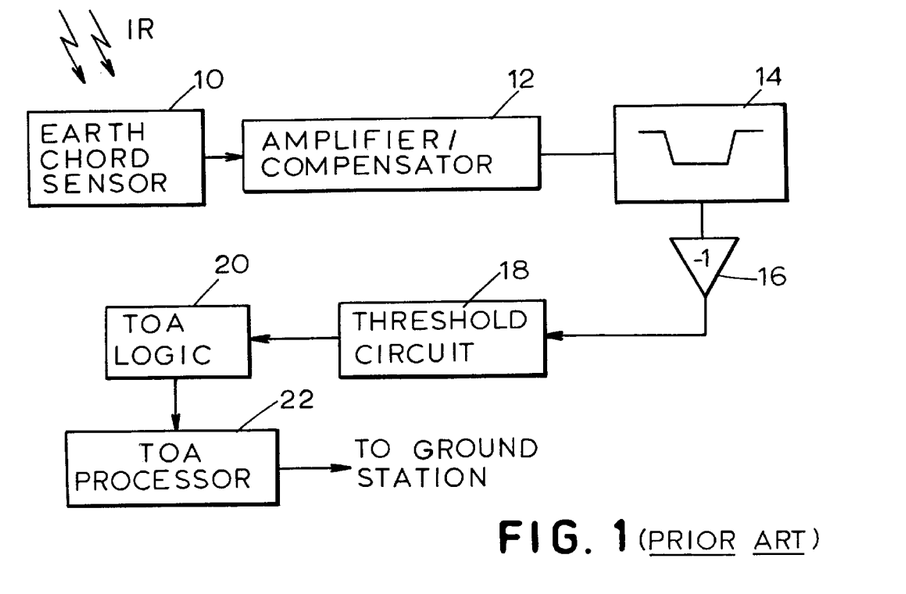
FIG. 1 is a block diagram of a prior art system for calculating an earth chord time in a satellite.

FIG. 1 is a block diagram of a prior art system for processing the output of an earth chord sensor on a satellite. The earth chord sensor 10 receives infrared radiance and converts the thermal input into an electrical signal which is conditioned by a amplifier/compensator 12 to produce a pulse. If the satellite is spinning at a relatively high spin rate (i.e. about 10 rpm) or if the earth chord being measured is short (i.e. about 1–2 seconds), the output of the amplifier/compensator 12 is an inverted near trapezoidal pulse, as indicated by block 14 on FIG. 1. The pulse is passed through an inverter 16 which reverses the polarity of the pulse. The output pulse from the inverter 16 is provided to an analog threshold circuit 18 which compares the pulse to a predetermined voltage threshold (for example, 1 volt). A time-of-arrival (TOA) logic circuit 20 then calculates the time at which the leading edge and trailing edge of the pulse cross the voltage threshold. All of these components may be included in hardware on the satellite.

The leading edge and trailing edge times calculated by the TOA logic circuit 20 are then provided to a TOA software processor 22 which simply subtracts the two times to calculate the time it took the sensor 10 to sweep across the earth. The TOA software processor 22 may be included as part of a central spacecraft processor (SCP) located on the processor. The earth chord time is then transmitted by telemetry to a ground station on the earth, which computes the orientation of the satellite. The ground station may also receive information from other on-board sensors, such as a sun sensor, that is used in computing the orientation of the satellite.

Figure 2:
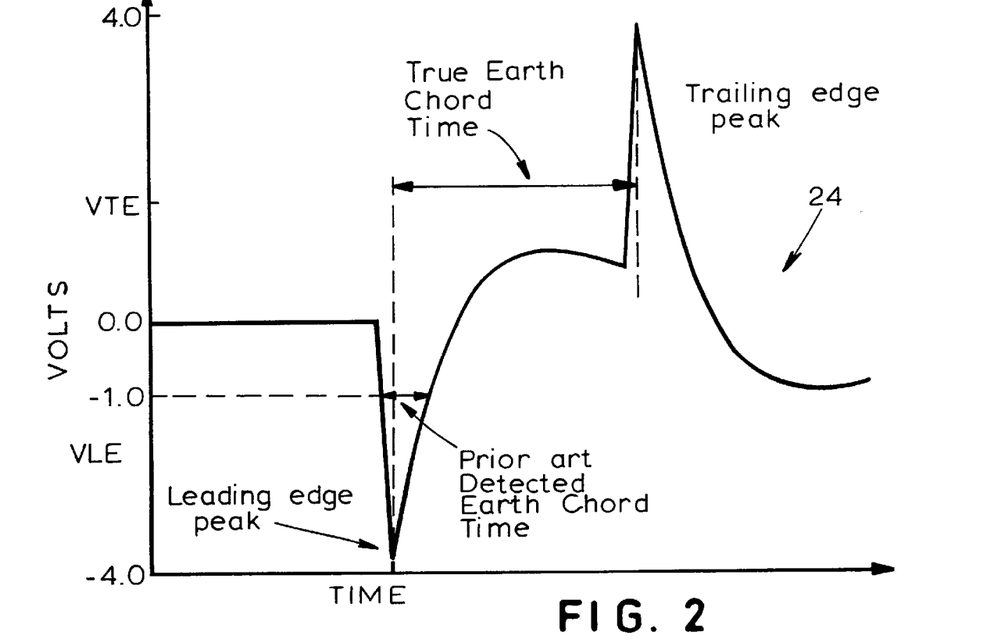
FIG. 2 is a graph of a pulse generated by an earth chord sensor on a satellite when the satellite is spinning at a low spin rate or when the sensor is measuring a long earth chord.

This prior art system effectively calculates the earth chord time as long as the satellite is spinning at a high enough rate or the earth chord is short enough for the sensor to generate a near trapezoidal pulse. If the satellite is spinning at a lower rate (i.e. less than about 10 rpm) or the earth chord is long (i.e. greater than about 3 seconds), however, the earth chord sensor generates an irregular pulse 24 as shown in FIG. 2. At low spin rates or with long earth chords, when the earth chord sensor first encounters the earth, the sensor generates a sharp negative voltage peak (referred to as the leading edge peak). As the sensor sweeps across the earth, the sensor "droops" upwards to a positive voltage. When the earth leaves the view of the sensor, the sensor produces a sharp positive voltage peak (referred to as the trailing edge peak) and then slowly "droops" towards a zero voltage. The droop in the sensor output at low spin rates or during long earth chords is caused by the sensor behaving like a high pass filter.

As shown in FIG. 2, the true earth chord time for the low spin rate pulse 24 is the time between the leading edge peak and the trailing edge peak. The prior art system of FIG. 1, however, which calculates the earth chord time by determining the leading edge and trailing edge of a pulse at a threshold voltage level, incorrectly calculates the earth chord time of the low spin rate pulse 24 as the width of the leading edge pulse at the voltage threshold. Therefore, there remains a need for a system and method for determining earth chord times for a satellite spinning at a low spin rate (i.e. less than about 10 rpm) or which is measuring a long earth chord (i.e. greater than about 3 seconds).

SUMMARY OF THE INVENTION

The system and method of the present invention overcomes the shortcomings of the prior art system by digitizing the output of the earth chord sensor and processing the digitized output to calculate the time between the leading edge peak and the trailing edge peak of a pulse generated at low spin rates or for long earth chords.

According to one aspect of the present invention, a system for determining an earth chord time of a satellite, wherein the satellite is spinning at a low spin rate or measuring a long earth chord, comprises an earth chord sensor for generating an electrical pulse, an analog to digital converter for digitizing the pulse, and a processor which receives the digitized pulse, detects a leading edge peak and a trailing edge peak of the pulse and calculates a time difference between the leading edge peak and the trailing edge peak.

According to another aspect of the present invention, a method of determining an earth chord time of a satellite, wherein the satellite is spinning at a low spin rate or measuring a long earth chord, comprises the steps of digitizing an output pulse of an earth chord sensor, detecting a leading edge peak of the pulse, detecting a trailing edge peak of the pulse and calculating a time difference between the leading edge peak and the trailing edge peak of the pulse.

DESCRIPTION OF THE PREFERRED EMBODIMENT(S)

Figure 3:
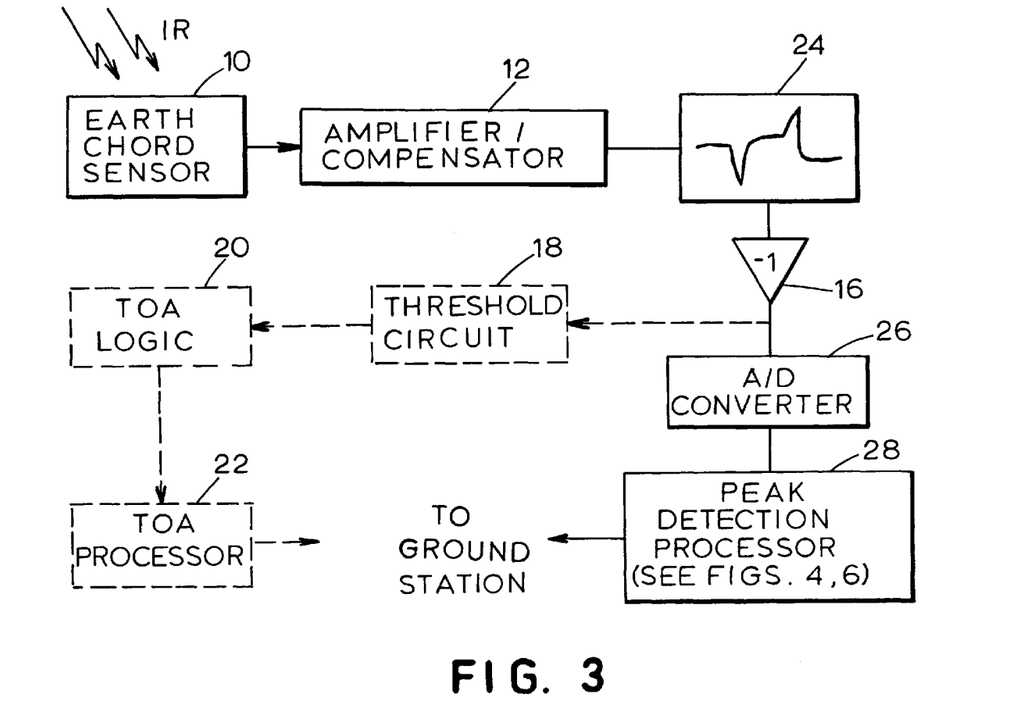
FIG. 3 is a block diagram of the system of the present invention for calculating an earth chord time in a satellite which is spinning at a low spin rate or which is measuring a long earth chord.

FIG. 3 is a block diagram of the system of the present invention for calculating an earth chord time for a satellite when the satellite is spinning at a low spin rate or when the satellite is measuring a long earth chord. The present invention may be implemented, for example, in a HS601HP satellite, manufactured by Hughes, or in any other communications or other type of satellite. As described above in connection with FIG. 1, the earth chord sensor 10, which may be, for example, a Barnes HCI sensor, receives infrared radiance and converts the thermal input to an electrical signal which is conditioned by the amplifier/compensator 12. If the satellite is spinning at a low spin rate (i.e. less than about 10 rpm), the electrical signal generated by the earth chord sensor 10 is of the shape of the pulse 24 of FIG. 2. The pulse 24 is inverted by the inverter 16.

In contrast to the prior art system which used analog circuitry to process the output of the earth chord sensor 10, in accordance with the present invention, the output of the inverter 16 is provided to an analog-to-digital (A/D) converter 26. The A/D converter 26 samples the pulse 24 to produce a digitized output pulse. In a preferred embodiment, the A/D converter 26 uses an approximately 32 ms sampling rate to digitize the pulse. It is understood, however, that a different sampling rate could be used. The digitized output pulse is then provided to a peak detection processor 28, which detects the leading edge and trailing edge peaks of the pulse 24 and calculates the time difference between the two peaks to determine the earth chord time, as described in detail below. The peak detection processor 28 may be included as part of a central spacecraft processor (SCP) on the satellite. The earth chord time output of the peak detection processor 28 is transmitted by telemetry to the ground station for further processing to determine the orientation of the satellite. The ground station may also receive information from other on-board sensors which is used to determine the orientation of the satellite.

Optionally, the satellite may include two or more on-board earth chord sensors positioned at different angles. If two earth sensors are used, for example, the two output pulses from the sensors could be processed simultaneously by identical processing to ensure accuracy.

As illustrated by the dashed lines in FIG. 3, the system of the present invention may also optionally include the hardware threshold circuit 18 and TOA logic circuit 20 and the TOA processor 22 of the prior art system to determine the earth chord time when the satellite is spinning at a high spin rate or measuring a short earth chord such that the earth chord sensor generates a near trapezoidal pulse.

Figure 4:
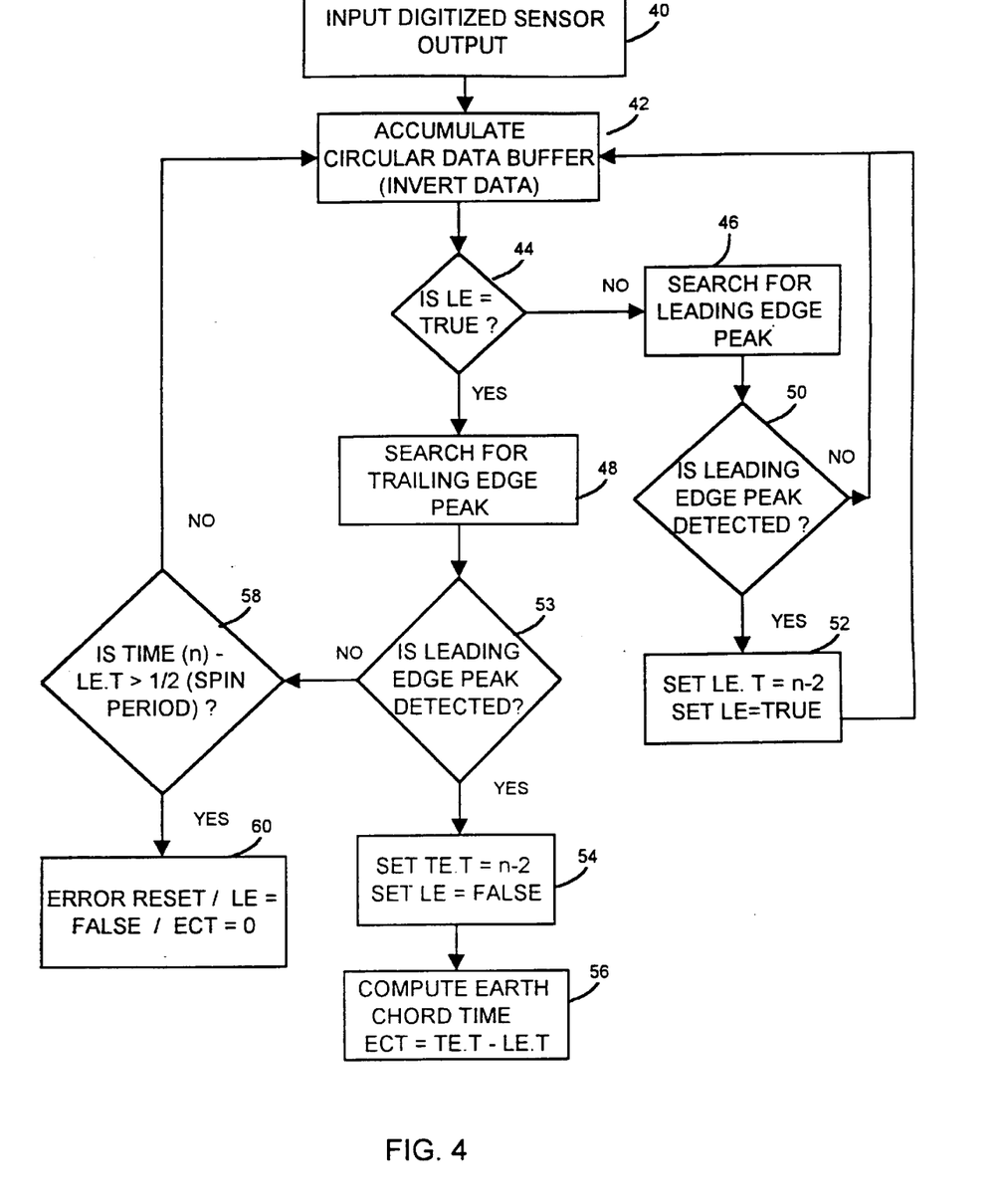
FIG. 4 is a flowchart illustrating one embodiment of the steps performed by the peak detection processor of the present invention to calculate an earth chord time in a satellite which is spinning at a low spin rate or which is measuring a long earth chord.

FIG. 4 is a flowchart of the steps performed by the peak detection processor 28 of the present invention. A block 40 receives the digitized sensor output from the A/D converter 26. A block 42 then accumulates a data buffer or window which will be used to process the digitized sensor output data points. The buffer is a circular FIFO (first-in-first-out) buffer that receives one data point at a time—as each new data point is received, the oldest data point is removed from the buffer. In a preferred embodiment, the buffer holds five data points but may contain a minimum of only three data points. It is understood, however, that the buffer could also be configured to hold a different number of data points.

In one embodiment, each data point is inverted prior to being provided to the data buffer. The points are inverted in order to compensate for the inversion of the pulse by the inverter 16 before the pulse was digitized. Thus, the processor 28 is programmed to detect a negative leading edge peak and a positive trailing edge peak. Alternatively, however, the data points would not be inverted before being provided to the buffer and the processor 28 would be programmed to detect a positive leading edge peak and a negative trailing edge peak.

A block 44 then determines whether a leading edge peak or a trailing edge peak should be detected by checking whether a boolean variable called, for example, "LE", is true. The variable LE (leading edge) will be used to determine whether the leading edge peak of the pulse has been detected. If LE is false (indicating the leading edge peak has not been detected), a block 46 searches for a leading edge peak. Alternatively, if the variable LE is true (indicating the leading edge peak has already been detected), a block 48 searches for a trailing edge peak. As described in detail below, the variable LE is set to true after a leading edge peak has been detected (block 52) and is set to false after a trailing edge peak has been detected (block 54).

Figure 5:
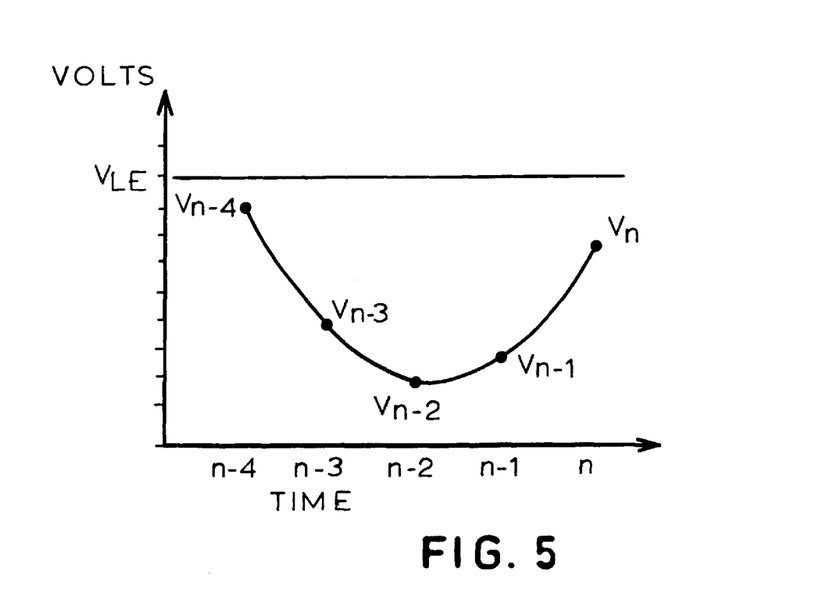
FIG. 5 is a voltage vs. time graph of sample data points processed by the peak detection processor to detect a leading edge peak.

In one embodiment, the block 46 searches for the leading edge peak by comparing the voltage values of the five data points currently in the buffer. The data points in the buffer will be referred to as $V_{n-4}$, $V_{n-3}$, $V_{n-2}$, $V_{n-1}$ and $V_n$, where n represents the current time. Generally, the block 46 determines whether the middle data point: ($V_{n-2}$) is less than the other data points, indicating that the middle data point is the leading edge peak of the sensor output pulse. FIG. 5 is an example of a voltage vs. time graph of the data points, wherein the middle data point ($V_{n-2}$) represents the leading edge peak. Further, the block 46 may compare whether the first data point ($V_{n-4}$) is less than a predetermined leading edge threshold voltace ($V_{LE}$), which may be, for example, −1.5 volts. Comparing the data points to the threshold voltage prevents the system from detecting, for example, a noise spike in the pulse as the leading edge peak. Thus, the block 46 performs the following comparisons:

IS $V_{n-2} < V_{n-3}$?

IS $V_{n-2} < V_{n-4}$?

IS $V_{n-2} < V_{n-1}$?

IS $V_{n-2} < V_n$?

IS $V_{n-4} < V_{LE}$?

If any one of the above-listed comparisons are false, a block 50 determines that a leading edge peak has not been detected among the current five data points and the processor 28 loops back to the block 42 to input the next data point into the buffer and repeats the process until a leading edge peak is detected. Alternatively, if all of the comparisons are true, the block 50 determines that a leading edge peak has been detected. A block 52 then sets a variable (called, for example, "LE.T") to the time (n−2) corresponding to the middle data point ($V_{n-2}$). The block 52 also sets the boolean variable LE equal to true, indicating that the leading edge peak has been detected and the processor 28 returns to the block 42 to accumulate the next data point into the buffer.

After the leading edge peak has been detected, the block 44 determines that the variable LE is true and skips to the block 48 to search for the trailing edge peak. The trailing edge peak may be determined by a similar calculation as the leading edge peak. However, because the leading edge peak is a positive voltage (see FIG. 2), the block 48 determines whether the middle data point ($V_{n-2}$) in the five point buffer is greater than the surrounding data points. Also, the block 48 may determine whether the first data point ($V_{n-4}$) is greater than a predetermined trailing edge threshold voltage ($V_{TE}$), which may be, for example, 1.5 volts. Thus, the block 48 makes the following comparisons:

Is $V_{n-2}>V_{n-3}$?

Is $V_{n-2}>V_{n-4}$?

Is $V_{n-2}>V_{n-1}$?

Is $V_{n-2}>V_n$?

IS $V_{n-4}>V_{TE}$?

If all of the above-listed comparisons are true, a block 53 determines that the trailing edge peak has been detected. A block 54 sets a variable called, for example, "TE.T", to the time (n−2) corresponding to the middle data point ($V_{n-2}$). The block 54 also sets the variable LE back to false. A block 56 then calculates the earth chord time ("ECT") by subtracting the leading edge peak time (LE.T) from the trailing edge peak time (TE.T). Referring back to FIG. 3, the processor 28 transmits the calculated earth chord time to the ground station. A new earth chord time is calculated for each spin period of the satellite. (The spin period is the time for the satellite to make one complete revolution—i.e., if the satellite is spinning at 1 rpm, the spin period is 60 seconds). The processor 28 continually outputs the earth chord time until a new earth chord time is calculated for the next spin period.

If any of the above-listed comparisons are false, the block 52 determines that the trailing edge peak has not been detected among the current five data points and the processor 28 returns to the block 42 to input the next data point into the buffer for processing. Optionally, however, before returning to the block 42, the processor 28 may perform an error check comprising the blocks 58 and 60.

The block 58 determines whether the current time (n) minus the time corresponding to the leading edge peak (LE.T) is greater than some predetermined fraction (for example, ½) of the spin period of the satellite. If the error check is used, the spin period could be input to the block 40. The earth chord time is a fraction of the spin period (i.e., approximately 10 seconds for a 60 second spin period). Thus, if a trailing edge peak has not been detected by a certain time within the spin period, the block 58 assumes that the trailing edge peak was "missed" and skips to a block 60, which resets the processing to the block 40 to receive the next digitized sensor output. The block 60 resets the variable LE to false and sets the earth chord time (ECT) to zero, indicating that no earth chord time was calculated for the current spin period.

Alternatively, if the error check block 58 is false, the processing returns to the block 42 to input the next data point into the data buffer and repeats the process until the trailing edge peak is detected.

Figure 6A:
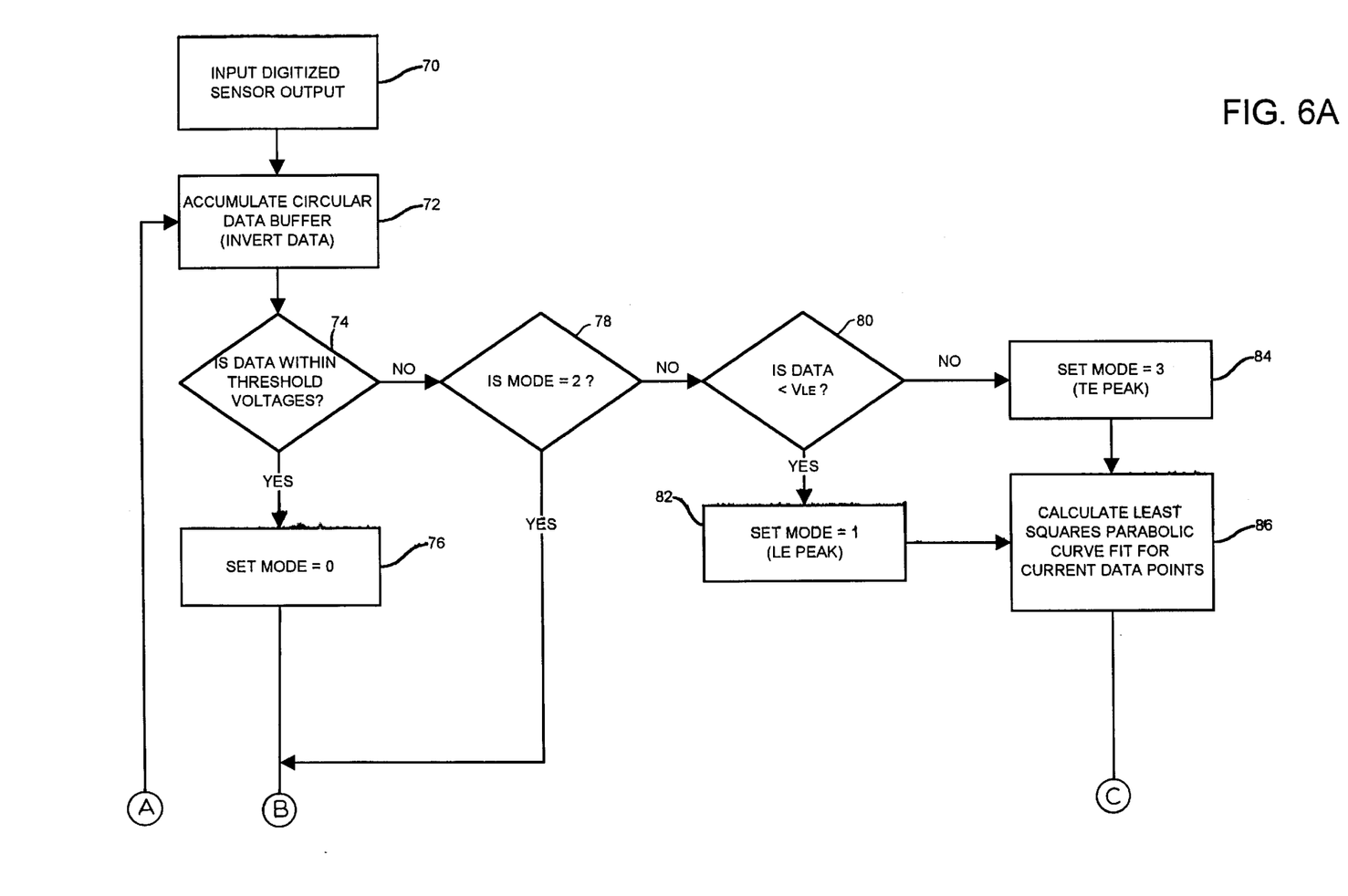
FIGS. 6A and 6B, when joined at the similarly lettered lines, comprise a flowchart illustrating an alternative embodiment of the steps performed by the peak detection processor of the present invention to calculate an earth chord time in a satellite which is spinning at a low spin rate or which is measuring a long earth chord.
Figure 6B:
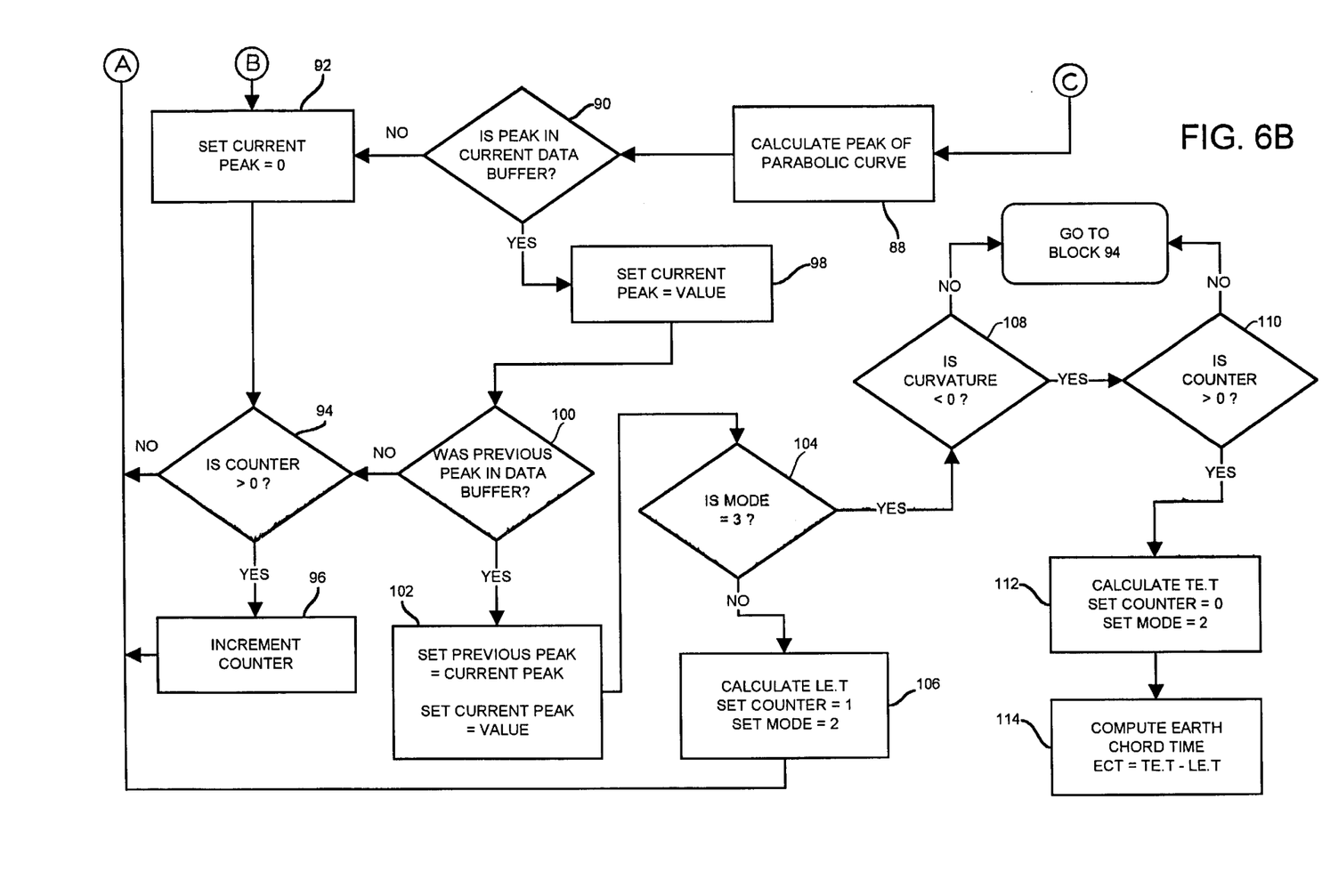

FIG. 6 is a flowchart illustrating an alternative embodiment of the steps performed by the peak detection processor 28 of the present invention to calculate an earth chord time in a satellite which is spinning at a low spin rate. The alternative processing of FIG. 6 requires greater computation time than the processing described above in connection with FIG. 4. The FIG. 6 processing, however, is less sensitive to noise than the FIG. 4 processing and also eliminates temporal quantization errors. The FIG. 6 processing also is more effective if the satellite is approaching a high spin rate (i.e. close to about 10 rpm).

Referring to FIG. 6, a block 70 receives the digitized sensor output. A block 72 then accumulates a circular FIFO data buffer or window which will be used to analyze the data points of the digitized sensor output. In a preferred embodiment, the data buffer is an 8 point buffer. However, the number of data points used in the buffer may vary depending on the spin rate of the satellite. For example, for spin rates of about 5 rpm, only 4 data points are accumulated into the data buffer at a time. For lower spin rates (about 1 rpm), all 8 points in the buffer are used. It is understood, however, that the buffer could be configured to hold a different number of data points.

Next, a block 74 determines whether the current data point provided to the buffer is between two predetermined threshold voltages, a leading edge threshold voltage ($V_{LE}$) and a trailing edge threshold voltage ($V_{LE}$). Referring also to FIG. 2, the leading edge threshold voltage ($V_{LE}$) is a predetermined voltage, wherein it is assumed that the leading edge peak voltage will be less than the threshold voltage. Similarly, it is assumed that the trailing edge peak voltage will be greater than the trailing edge threshold voltage ($V_{TE}$). Assuming the leading edge and trailing edge threshold voltages are −1.5 volts and +1.5 volts, respectively, the block 74 determines whether the current data point is between −1.5 volts and +1.5 volts.

If the block 74 is true, a block 76 sets a mode flag equal to zero, indicating that the data point is within the threshold voltages and, therefore, is not a peak voltage. Alternatively, if the block 74 is false and the data point is outside of the threshold voltages, a block 78 checks whether the mode flag is equal to two. A mode of two indicates that a peak has just been detected, but the data point voltage is not yet between the threshold voltages. The mode of two prevents a second "false" peak from being detected immediately after a true leading edge or trailing edge peak has been detected.

If the mode flag is not two (i.e., it has been set to zero by the block 76), a block 80 determines whether the current data point is less than the leading edge threshold voltage ($V_{LE}$). If the block 80 is true, a block 82 sets the mode flag equal to 1, indicating that it is searching for a leading edge peak. Alternatively, if the block 80 is false, a block 84 sets the mode flag equal to 3, indicating that it is searching for a trailing edge peak.

Next, a block 86 determines a second order least squares parabolic curve fit for all of the data points currently in the buffer. Thus, the block 86 generates a second order polynomial equation that defines the parabolic curve that best fits the data points. The polynomial equation generated by the block 86 is as follows:

$$y = ax^2 + bx + c \qquad \text{(Eq. 1)}$$

In Eq. 1 above, x represents the index value of the data point and y represents the voltage value of the data point. Thus, assuming eight data points in the buffer, the block 86 generates the following equations:

$$y_1 = ax_1^2 + bx_1 + c \quad \text{(Eqs. 2)}$$
$$y_2 = ax_2^2 + bx_2 + c$$
$$\vdots$$
$$y_8 = ax_8^2 + bx_8 + c$$

If the buffer is indexed from −1 to −8 ($x_1$=−1, $x_2$=−2, etc.), substituting these values into Eqs. 2, above, and putting the equations in matrix form yields the following equation:

$$\begin{bmatrix} y_1 \\ y_2 \\ y_3 \\ y_4 \\ y_5 \\ y_6 \\ y_7 \\ y_8 \end{bmatrix} = \begin{bmatrix} 1 & -1 & 1 \\ 4 & -2 & 1 \\ 9 & -3 & 1 \\ 16 & -4 & 1 \\ 25 & -5 & 1 \\ 36 & -6 & 1 \\ 49 & -7 & 1 \\ 64 & -8 & 1 \end{bmatrix} [a\ b\ c] \quad \text{(Eq. 3)}$$

Since the voltage values $Y_1$–$y_8$ are known, the values of a, b and c are calculated by multiplying the voltages by the pseudoinverse of the parabolic curve fit matrix as follows:

$$\begin{bmatrix} a \\ b \\ c \end{bmatrix} = \begin{bmatrix} 1 & -1 & 1 \\ 4 & -2 & 1 \\ 9 & -3 & 1 \\ 16 & -4 & 1 \\ 25 & -5 & 1 \\ 36 & -6 & 1 \\ 49 & -7 & 1 \\ 64 & -8 & 1 \end{bmatrix}^{-1} \begin{bmatrix} y_1 \\ y_2 \\ y_3 \\ y_4 \\ y_5 \\ y_6 \\ y_7 \\ y_8 \end{bmatrix} \quad \text{(Eq. 4)}$$

For the 8 data point buffer parabolic curve fit matrix shown above, the pseudoinverse matrix is as follows:

$$\begin{bmatrix} 0.0417 & 0.0060 & -0.0179 & -0.0298 \\ -0.0298 & -0.0179 & 0.0060 & 0.0417 \\ 0.4583 & 0.1131 & -0.1250 & -0.2560 \\ -0.2798 & -0.1964 & -0.0060 & 0.2917 \\ 1.1250 & 0.4821 & 0.0179 & -0.2679 \\ -0.3750 & -0.3036 & 0.0536 & 0.3750 \end{bmatrix} \quad \text{(Eq. 5)}$$

If only 4 points in the 8 point data buffer are used, the parabolic curve fit matrix is as follows:

$$\begin{bmatrix} 1 & -1 & 1 \\ 4 & -2 & 1 \\ 9 & -3 & 1 \\ 16 & -4 & 1 \end{bmatrix} \quad \text{(Eq. 6)}$$

If only 4 points in the data buffer are used, the pseudoinverse of the parabolic curve fix matrix of the Eq. 6 is as follows, wherein the remaining values in the matrix are set to zero:

$$\begin{bmatrix} 0.2500 & -0.2500 & -0.2500 & -0.2500 & 0 & 0 & 0 & 0 \\ 1.5500 & -1.1500 & -1.3500 & -0.9500 & 0 & 0 & 0 & 0 \\ 2.2500 & -0.7500 & -1.2500 & -0.7500 & 0 & 0 & 0 & 0 \end{bmatrix} \quad \text{(Eq. 7)}$$

To save computation time, the pseudoinverse parabolic curve fit matrices of Eqs. 5 and 7 may be precompiled off line.

After the block 86 generates the polynomial equation as shown in Eq. 1, a block 88 calculates the peak of the parabolic curve defined by the equation. The peak of the parabolic curve is calculated from Eq. 1 as follows:

$$\text{peak} = -b/2a \quad \text{(Eq. 8)}$$

Next, a block 90 determines whether the peak calculated by the block 88 is located within the current data buffer. The data buffer or window is indexed for each data point. In a preferred embodiment, the first point is indexed −1, the second point −2, the third point −3, etc. up to the maximum number of points in the buffer. Thus, an 8 point data buffer is indexed between −1 and −8. Assuming an 8 point data buffer, the block 90 determines whether the peak is located between −1 and −8. If the peak of the parabolic curve is not within the data buffer, the block 90 determines that the buffer does not contain a leading or trailing edge peak and a block 92 sets a variable called, for example, "current peak", to zero.

After the block 92 sets current peak to zero, indicating that no peak was found in the current data buffer, a block 94 checks the value of a real time interrupt (RTI) counter. The RTI counter corresponds to the frame rate of the processor (for example, 32 ms). The counter is initialized by the block 70 to zero and remains set to zero until a leading edge peak is detected. As explained in more detail below, after a leading edge peak time is calculated, the counter is set to 1 (block 106) and is incremented every time a data point is added to the buffer until the trailing edge peak time is calculated.

Thus, if the block 94 determines that the counter is greater than zero, the leading edge peak has already been detected and a block 96 increments the counter and the processor 28 returns to the block 72 to accumulate the next data point into the buffer. Alternatively, if the counter is not greater than zero, the leading edge peak has not yet been detected and the counter should not be incremented. Thus, the processor 28 skips the block 96 and returns to the block 72 to accumulate the next data point into the buffer. (As illustrated in FIG. 6, the processing path of blocks 92, 94 and 96 is also implemented if the block 78 determines that the mode flag is equal to 2 or if the block 74 determines that the data point is within the threshold voltages).

If the block 90 determines that the peak of the parabolic curve (calculated by block 88) is within the data buffer, a block 98 sets the variable current peak equal to the index value corresponding to the parabolic curve peak. Thus, if the peak of the parabolic curve was between the first data point (index −1) and the second data point (index −2) in the buffer, the block 98 would set the variable current peak equal to, for example, −1.5.

A block 100 then determines whether the previous peak calculated by the block 88 was also located within the current data buffer. The block 100 prevents the processor 28 from detecting false peak caused, for example, by noise in the pulse signal. If successive peaks are found within the data buffer, it is assumed that a true peak has been detected (i.e. either the leading edge peak or the trailing edge peak of the pulse). If two successive peaks are not found, it is assumed the first peak was a false peak and the processor skips to the block 94, described above.

Alternatively, if block 100 determines that successive peaks were found in the data buffer, a block 102 sets a variable called, for example, "previous peak", equal to the value of the variable current peak such that previous peak contains the index value of the first peak detected. The block 102 also sets the variable current peak equal to the index value of the second peak detected.

After the block 102 saves the index values of the two successive peaks, a block 104 determines whether it is searching for a leading edge peak (mode=1) or a trailing edge peak (mode=3). If a leading edge peak is being detected (mode is not equal to 3), a block 106 calculates the leading edge peak time (LE.T). If a four point data buffer was used, the leading edge peak time is determined by the index value of the first peak detected, which was saved in the variable previous peak. As explained above, the data buffer is indexed using negative numbers beginning with −1. To compensate for this (i.e. effectively start the index at 0), 1 is added to the value of previous peak. Thus, for a four point data buffer (spin rates of about 5 rpm), the leading edge peak time (LE.T) is calculated as follows:

$$LE.T = 1 + \text{previous peak} \quad (Eq. 9)$$

Alternatively, for an eight point data buffer (spin rates of about 1 rpm), the leading edge peak time is determined by averaging the index values of the two peaks, which were saved in the variables current peak and previous peak. Also, as explained above, 1 must be added to the previous peak value to compensate for the negative indexing. Similarly, 2 must be added to the current peak value (which has been shifting by one in the index) to compensate for the negative indexing. Therefore, 3 is added to the values of previous peak and current peak before averaging. Thus, for an eight point data buffer, the leading edge peak time (LE.T) is calculated as follows:

$$LE.T = \frac{(3 + \text{current peak} + \text{previous peak})}{2} \quad (Eq. 10)$$

After the leading edge peak time (LE.T) is calculated using either Eq. 9 or Eq. 10 above, the block 106 sets the mode flag equal to 2 (indicating that a peak has been detected). The block 106 also sets the counter to 1, indicating that the leading edge peak time has been calculated. The counter will now be incremented (by the block 96) every time a new data point is added to the buffer.

Alternatively, if the block 104 determines that it is searching for a trailing edge peak (mode=3), a block 108 performs a second check to determine whether a trailing edge peak is imminent. Referring also to FIG. 2, the trailing edge peak is a concave down curve. A concave up "false peak" may be present after the sensor output crosses the zero voltage and then droops slightly before sharply increasing towards the trailing edge peak. Depending on the characteristics of the sensor and the spin rate of the satellite, this false peak may be located outside of the threshold voltages.

Therefore, to avoid interpreting a false peak as the trailing edge peak, the block 106 determines whether the curvature of the parabolic curve calculated by the block 86 is positive (concave up) or negative (concave down). The curvature of the parabolic curve is determined by the sign of the variable "a" in Eq. 1. If the curvature is concave up ("a" is positive), it is assumed that a false peak has been detected and the processing skips to the block 94, described above.

Alternatively, if the curvature is concave down ("a" is negative), a block 110 determines whether the counter is greater than zero, indicating that the leading edge peak time has already been determined and the trailing edge peak time should be calculated. The block 110 is a safety check to ensure that the processing is working correctly. If the counter is not greater than zero, the processing skips to the block 94, described above.

If the block 110 determines that the counter is greater than zero, a block 112 calculates the trailing edge peak time (TE.T). If a four point data buffer was used, the trailing edge peak time is the sum of the counter and the index value of the first peak detected, which was saved in the variable previous peak. Thus, for a four point data buffer, the trailing edge peak time (TE.T) is calculated as follows:

$$TE.T = \text{counter} + \text{previous peak} \quad (Eq. 11)$$

As explained above, the previous peak index value is a negative number and the counter was incremented as each data point entered the data buffer. Therefore, Eq. 5 essentially subtracts the index value for all data points that were included in the buffer after the peak data point.

Alternatively, if an eight point data buffer was used, the trailing edge peak time is an average of the sum of the index values of the two successive detected peaks (saved in the variables current peak and previous peak) and the counter (which is doubled to account for the averaging). Because the current peak value is being used, 1 must be added to compensate for shifting in the negative index value for the current peak. Thus, for an eight point data buffer, the trailing edge peak time (TE.T) is calculated as follows:

$$TE.T = \frac{(2 * \text{counter} + 1 + \text{cur peak} + \text{prev peak})}{2} \quad (Eq. 12)$$

After the trailing edge peak time is calculated using either Eq. 11 or Eq. 12 above, the block 112 resets the counter to zero and sets the mode flag to 2. A block 114 then computes the earth chord time (ECT) as the difference between the trailing edge peak time (TE.T) and the leading edge peak time (LE.T). Thus, ECT=TE.T−LE.T. As described above, the processor 28 transmits by telemetry the earth chord time to the ground station until a new earth chord time is calculated for the next spin period of the satellite.

As explained in detail above, the processing of FIG. 6 detects two successive peaks in the data buffer before a leading edge peak or trailing edge peak is recognized. However, alternative processing may be implemented in accordance with the present invention to calculate the leading and trailing edge peaks. For example, after the first peak is detected in the data buffer, the processor 28 may calculate a least squares linear curve fit to previous "peaks" that were calculated from the parabolic curve fit. If the detected peak is a true leading edge or trailing edge peak, the slope of the calculated lines should converge to −1 as the peak moves through the data buffer. If the slope does not converge to −1, the processor knows a false peak has been detected. Otherwise, the processor may then interpolate between successive index points on the line to calculate the leading edge and trailing edge peaks.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the system may be varied substantially without departing from the spirit of the invention, and the exclusive use of all modifications which are within the scope of the appended claims is reserved.

What is claimed is:

1. A system for determining an earth chord time of a satellite, wherein the satellite is spinning at a low spin rate or wherein the satellite is measuring a long earth chord, comprising:

an earth chord sensor for generating an electrical pulse;

an analog to digital converter for digitizing the pulse; and a processor which receives the digitized pulse, detects a leading edge peak and a trailing edge peak of the pulse and calculates a time difference between the leading edge peak and the trailing edge peak.

2. The system of claim 1, further comprising an inverter which inverts the electrical pulse.

3. The system of claim 1, wherein the processor receives the digitized pulse through a data buffer.

4. The system of claim 3, wherein the processor detects the leading edge peak by determining whether a middle data point in the data buffer is less than all other data points in the data buffer.

5. The system of claim 4, wherein the processor detects the leading edge peak by further determining whether the data points in the data buffer are less than a threshold voltage.

6. The system of claim 3, wherein the processor detects the trailing edge peak by determining whether a middle data point in the data buffer is greater than all other data points in the data buffer.

7. The system of claim 6, wherein the processor detects the trailing edge peak by further determining whether the data points in the data buffer are greater than a threshold voltage.

8. The system of claim 3, wherein the processor detects the leading edge peak and the trailing edge peak by generating a parabolic equation from data points in the data buffer.

9. The system of claim 1, wherein the processor transmits by telemetry the time difference between the leading edge peak and the trailing edge peak to a ground station.

10. A method of determining an earth chord time of a satellite, wherein the satellite is spinning at a low spin rate or wherein the satellite is measuring a long earth chord, comprising the steps of:

digitizing an output pulse of an earth chord sensor;

detecting a leading edge peak of the pulse;

detecting a trailing edge peak of the pulse; and calculating a time difference between the leading edge peak and the trailing edge peak of the pulse.

11. The method of claim 10, further comprising the step of accumulating data points from the digitized output pulse into a data buffer after the step of digitizing the output pulse.

12. The method of claim 11, wherein the step of detecting the leading edge peak further comprises determining whether a middle data point in the buffer is less than all other data points in the buffer.

13. The method of claim 12, wherein the step of detecting the leading edge peak further comprises determining whether the data points in the buffer are less than a threshold voltage.

14. The method of claim 12, further comprising the step of setting a leading edge peak time to a time corresponding to the middle data point in the buffer after determining that the middle data point is less than all other data points in the buffer.

15. The method of claim 11, wherein the step of detecting the trailing edge peak further comprises determining whether a middle data point in the buffer is greater than all other data points in the buffer.

16. The method of claim 15, wherein the step of detecting the trailing edge peak further comprises determining whether the data points in the buffer are greater than a threshold voltage.

17. The method of claim 15, further comprising the step of setting a trailing edge peak time to a time corresponding to the middle data point in the buffer after determining that the middle data point is greater than all other data points in the buffer.

18. The method of claim 11, wherein the steps of detecting a leading edge peak and a trailing edge peak of the pulse further comprises the steps of curve fitting a parabolic equation from the data points in the buffer, calculating a peak of the parabolic equation, determining whether the calculated peak of the parabolic equation corresponds to a data point in the buffer, and if the calculated peak corresponds to a data point in the buffer, saving the value of the corresponding data point.

19. The method of claim 18, further comprising the step of determining whether successive calculated peaks correspond to data points in the buffer.

20. The method of claim 18, further comprising the step of determining whether a data point in the buffer is within a threshold voltage range before detecting a peak.

21. The method of claim 10, further comprising the step of inverting an output pulse of an earth chord sensor before digitizing the pulse.

22. The method of claim 10, further comprising the step of transmitting by telemetry the time difference between the leading edge peak and the trailing edge peak to a ground station.

* * * * *